(12) United States Patent
Luo et al.

(10) Patent No.: US 11,739,792 B2
(45) Date of Patent: Aug. 29, 2023

(54) ROTARY SHAFT ASSEMBLY AND LAMP

(71) Applicant: Sinowell (Shanghai) Co., Ltd., Shanghai (CN)

(72) Inventors: Jia Luo, Shanghai (CN); Yunfei Duan, Shanghai (CN); Liang Zhou, Shanghai (CN)

(73) Assignee: SINOWELL (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/933,475

(22) Filed: Sep. 19, 2022

(65) Prior Publication Data

US 2023/0012232 A1 Jan. 12, 2023

Related U.S. Application Data

(63) Continuation of application No. PCT/CN2022/100734, filed on Jun. 23, 2022.

(30) Foreign Application Priority Data

Apr. 20, 2022 (CN) .......................... 202210438022.0
Apr. 20, 2022 (CN) .......................... 202220918627.5

(51) Int. Cl.
*F16C 11/10* (2006.01)
*F21V 21/30* (2006.01)
*F21Y 103/00* (2016.01)

(52) U.S. Cl.
CPC .............. *F16C 11/10* (2013.01); *F21V 21/30* (2013.01); *F21Y 2103/00* (2013.01)

(58) Field of Classification Search
CPC ..... Y10T 403/32254; Y10T 403/32262; Y10T 403/32418; Y10T 403/32606;
(Continued)

(56) References Cited

U.S. PATENT DOCUMENTS 3,584,793 A * 6/1971 Ilzig .................... F16M 11/2021
362/427
5,689,999 A * 11/1997 Wiley ..................... F16C 11/10
403/107
(Continued)

FOREIGN PATENT DOCUMENTS

CN 102345835 A 2/2012
CN 208620104 U 3/2019
(Continued)

OTHER PUBLICATIONS

International Search Report dated Jul. 22, 2022 from corresponding PCT Application No. PCT/CN2022/100734.

*Primary Examiner* — Jonathan P Masinick
(74) *Attorney, Agent, or Firm* — ArentFox Schiff LLP

(57) ABSTRACT

Provided are a rotary shaft assembly and a lamp. A first connecting base of the rotary shaft assembly is formed with a positioning hole. A second connecting base of the rotary shaft assembly is rotatably connected to the first connecting base. One end of a positioning pin of the rotary shaft assembly is movably connected to the second connecting base. The other end of the positioning pin is configured to enter or exit the positioning hole from a first side of the positioning hole. An unlocking pin of the rotary shaft assembly is configured to enter or exit the positioning hole from a second side of the positioning hole. The unlocking pin is configured to drive the positioning pin to exit the positioning hole when the unlocking pin enters the positioning hole.

14 Claims, 7 Drawing Sheets

(58) Field of Classification Search
CPC .............. Y10T 403/32951; F16C 11/04; F16C 11/045; F16C 11/10
See application file for complete search history.

(56) References Cited

U.S. PATENT DOCUMENTS

| | | | |
|---|---|---|---|
| 6,196,568 B1* | 3/2001 | Stevens | A61G 5/12 403/107 |
| 8,544,434 B2* | 10/2013 | Lin | F01L 1/3442 123/90.17 |
| 10,060,468 B2* | 8/2018 | Whitney | E04F 10/0614 |
| 10,246,897 B2* | 4/2019 | Chen | E04H 15/48 |
| 10,362,690 B2* | 7/2019 | Han | G02F 1/1333 |
| 2012/0063152 A1 | 3/2012 | Chang | |

FOREIGN PATENT DOCUMENTS

| | | | | |
|---|---|---|---|---|
| CN | 210107313 U | | 2/2020 | |
| CN | 111396765 A | * | 7/2020 | |
| CN | 111396765 A | | 7/2020 | |
| CN | 215446362 U | | 1/2022 | |
| DE | 19530717 A1 | * | 2/1997 | ............. A47D 1/002 |
| DE | 102014119135 A1 | * | 6/2016 | |

* cited by examiner

ROTARY SHAFT ASSEMBLY AND LAMP

CROSS-REFERENCE TO RELATED APPLICATION(S)

This is a continuation of International Patent Application No. PCT/CN2022/100734, filed Jun. 23, 2022, which claims priority to Chinese Patent Application No. 202220918627.5 filed with the China National Intellectual Property Administration (CNIPA) on Apr. 20, 2022 and Chinese Patent Application No. 202210438022.0 filed with the CNIPA on Apr. 20, 2022, the disclosures of which are incorporated herein by reference in their entireties.

TECHNICAL FIELD

The present application relates to the field of lamp technology, for example, a rotary shaft assembly and a lamp.

BACKGROUND

A foldable lamp has the advantages of occupying a small space and being easily stored because the foldable lamp can be reduced in terms of volume by being folded when not used. A rotary shaft is a key component of a foldable lamp, and the lamp can be rotatably folded after the rotary shaft and the lamp are assembled together.

The related art discloses a rotary shaft. The rotary shaft includes two connecting bases that are rotatably connected to each other. One connecting base is formed with a positioning recess. A spring and a positioning pin are disposed on the other connecting base. Under the action of the spring, the positioning pin can be pressed into the positioning recess. When the positioning pin is pressed into the positioning recess, the two connecting bases are locked and positioned. Since the length of the positioning pin pressed in the positioning recess is short, the positioning pin can compress the spring and exit the positioning recess simply when the two connecting bases are rotated hard in an opposite direction. When the positioning pin exits the positioning recess, the two connecting bases are unlocked. When the positioning pin is pressed into the same positioning recess again or into the next positioning recess, the two connecting bases are locked and positioned again.

Although the two connecting bases of the preceding rotary shaft can be locked and positioned by being rotated, only a small segment of the positioning pin is pressed in the positioning recess to implement the locking of the two connecting bases. The locking reliability of this method is low. If the two connecting bases are inadvertently rotated in the opposite direction, the positioning pin is prone to exit the positioning recess, and then the two connecting bases are rotated relative to each other. Therefore, there is an urgent need to provide a rotary shaft assembly and a lamp to solve the preceding technical problems.

SUMMARY

The present application provides a rotary shaft assembly having a high locking reliability.

The present application adopts the technical solution below.

A rotary shaft assembly includes a first connecting base, a second connecting base, a positioning pin and an unlocking pin.

The first connecting base is formed with a positioning hole.

The second connecting base is rotatably connected to the first connecting base.

A first end of the positioning pin is movably connected to the second connecting base. A second end of the positioning pin is configured to enter or exit the positioning hole from a first side of the positioning hole.

The unlocking pin is configured to enter or exit the positioning hole from a second side of the positioning hole. The unlocking pin is configured to drive the positioning pin to exit the positioning hole when the unlocking pin enters the positioning hole. The positioning pin is configured to enter the positioning hole when the unlocking pin exits the positioning hole and when the positioning pin is coaxial with the positioning hole.

The present application provides a lamp. The angle between two fluorescent tubes of the lamp can be adjusted. Moreover, when two mounting brackets of the lamp are rotated to a locking position, the locking reliability of the two is relatively high, and fluorescent tubes can be prevented from bumping due to a locking failure.

The present application adopts the technical solution below.

A lamp includes at least two mounting brackets and at least one preceding rotary shaft assembly. One mounting bracket is mounted on each first connecting base separately. One mounting bracket is mounted on each second connecting base separately. At least one fluorescent tube is mounted on each mounting bracket separately.

Figure 1:
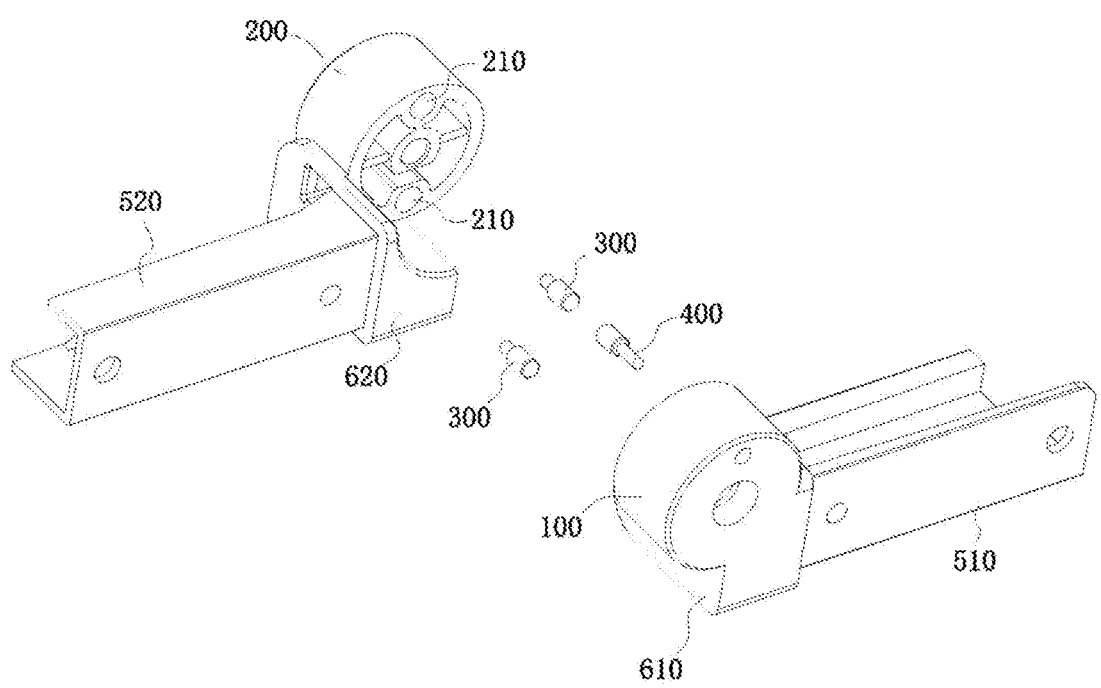
FIG. 1 is an exploded view illustrating the structure of a rotary shaft assembly according to an embodiment.

REFERENCE LIST 1 mounting bracket
2 fluorescent tube
3 rotary shaft assembly
4 wire accommodation box
100 first connecting base
110 positioning hole
111 stop
120 unlocking hole
130 wire securing recess
200 second connecting base
210 accommodation recess
211 lubrication groove
300 positioning pin
400 unlocking pin
510 first connecting portion 520 second connecting portion
610 first stop base
620 second stop base
700 elastic member

DETAILED DESCRIPTION

The present application is further described in detail hereinafter in conjunction with the drawings and embodiments. It is to be understood that the embodiments described herein are intended to illustrate and not to limit the present application. Additionally, it is to be noted that to facilitate description, only part, not all, of structures related to the present application are illustrated in the drawings.

In the description of the present application, terms "joined", "connected" and "secured" are to be understood in a broad sense unless otherwise expressly specified and limited. For example, the term "connected" may refer to "securely connected", "detachably connected" or "integrated", may refer to "mechanically connected" or "electrically connected" or may refer to "connected directly", "connected indirectly through an intermediary" or "connected inside two components" or "interaction relations between two components". For those of ordinary skill in the art, specific meanings of the preceding terms in the present application may be construed according to specific circumstances.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the present application, it should be noted that the orientations or position relations indicated by terms such as "above", "below", "right" and the like are based on orientations or position relations shown in the drawings. These orientations or position relations are intended only to facilitate and simplify description of the present application, and not to indicate or imply that a device or element referred to must have such specific orientations or must be configured or operated in such specific orientations. Thus, these orientations or position relations are not to be construed as limiting the present application. In addition, the terms "first" and "second" are used only to distinguish between descriptions and have no special meaning.

An embodiment provides a rotary shaft assembly having a high locking reliability. The rotary shaft assembly may be applied to products such as a foldable table, a foldable chair, a foldable computer stand and a foldable lamp and has high universality.

Figure 2:
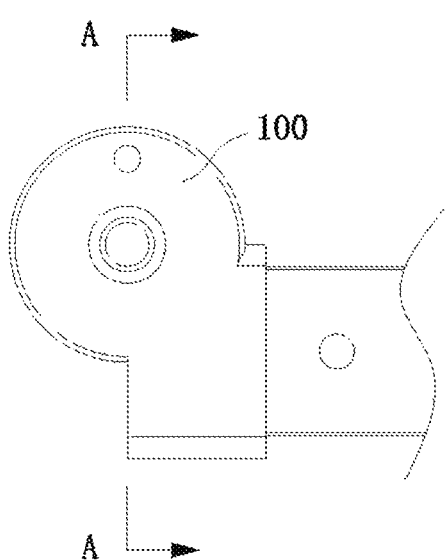
FIG. 2 is an enlarged partial view illustrating the planar structure of a first connecting base according to the embodiment.
Figure 3:
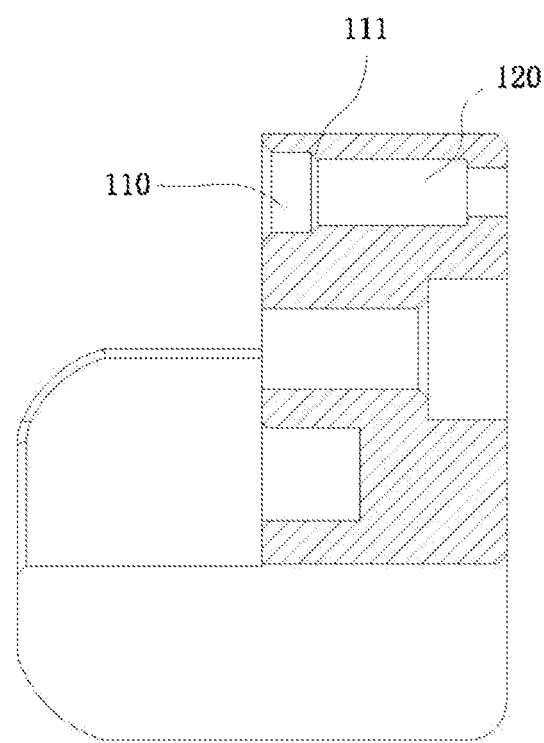
FIG. 3 is a section view taken along direction A-A of FIG. 2.
Figure 4:
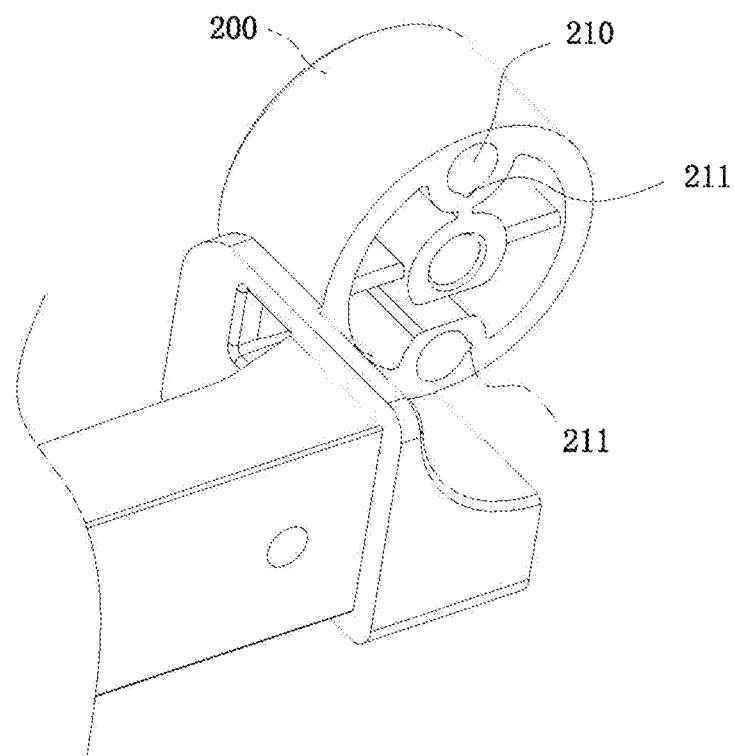
FIG. 4 is an enlarged partial view illustrating the perspective structure of a second connecting base according to the embodiment.
Figure 5:
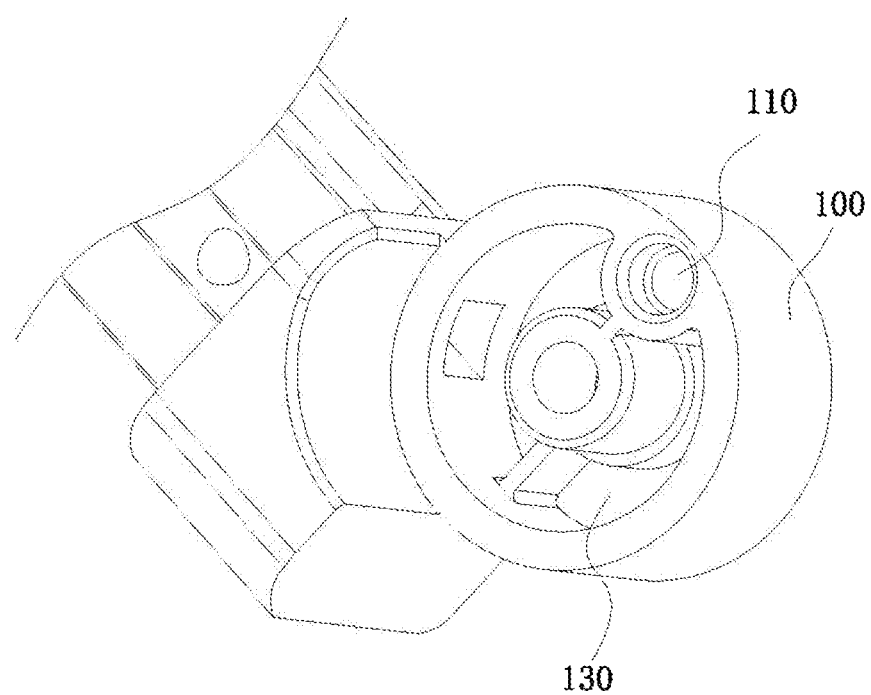
FIG. 5 is an enlarged partial view illustrating the perspective structure of the first connecting base according to the embodiment.

For example, as shown in FIGS. 1 to 3, the rotary shaft assembly includes a first connecting base 100, a second connecting base 200, a positioning pin 300 and an unlocking pin 400. The first connecting base 100 is formed with a positioning hole 110. The second connecting base 200 is rotatably connected to the first connecting base 100. A first end of the positioning pin 300 is movably connected to the second connecting base 200. A second end of the positioning pin 300 is configured to enter or exit the positioning hole 110 from a first side of the positioning hole 110. The unlocking pin 400 is configured to enter or exit the positioning hole 110 from a second side of the positioning hole 110. The unlocking pin 400 is configured to drive the positioning pin 300 to exit the positioning hole 110 when the unlocking pin 400 enters the positioning hole 110. The positioning pin 300 is configured to enter the positioning hole 110 when the unlocking pin 400 exits the positioning hole 110 and when the positioning pin 300 is coaxial with the positioning hole 110.

When the unlocking pin 400 of the rotary shaft assembly enters the positioning hole 110 and drives the positioning pin 300 to exit the positioning hole 110, the first connecting base 100 and the second connecting base 200 are unlocked from each other and can rotate relative to each other. When the unlocking pin 400 exits the positioning hole 110, and the positioning pin 300 is coaxial with the positioning hole 110, the positioning pin 300 enters the positioning hole 110. At this time, the first connecting base 100 and the second connecting base 200 are locked with each other and cannot rotate relative to each other. The first connecting base 100 and the second connecting base 200 cannot be unlocked from each other again until the unlocking pin 400 enters the positioning hole 110 again and drives the positioning pin 300 to exit the positioning hole 110. The rotary shaft assembly is provided with the unlocking pin 400, and the locking or unlocking of the first connecting base 100 and the second connecting base 200 is implemented by controlling the unlocking pin 400 to enter or exit the positioning hole 110 and controlling whether or not the positioning pin 300 is coaxial with the positioning hole 110. Compared with the related art, the rotary shaft assembly has a high locking reliability, and when the first connecting base 100 and the second connecting base 200 are locked to each other, the probability of relative rotation between the two is low.

Figure 7:
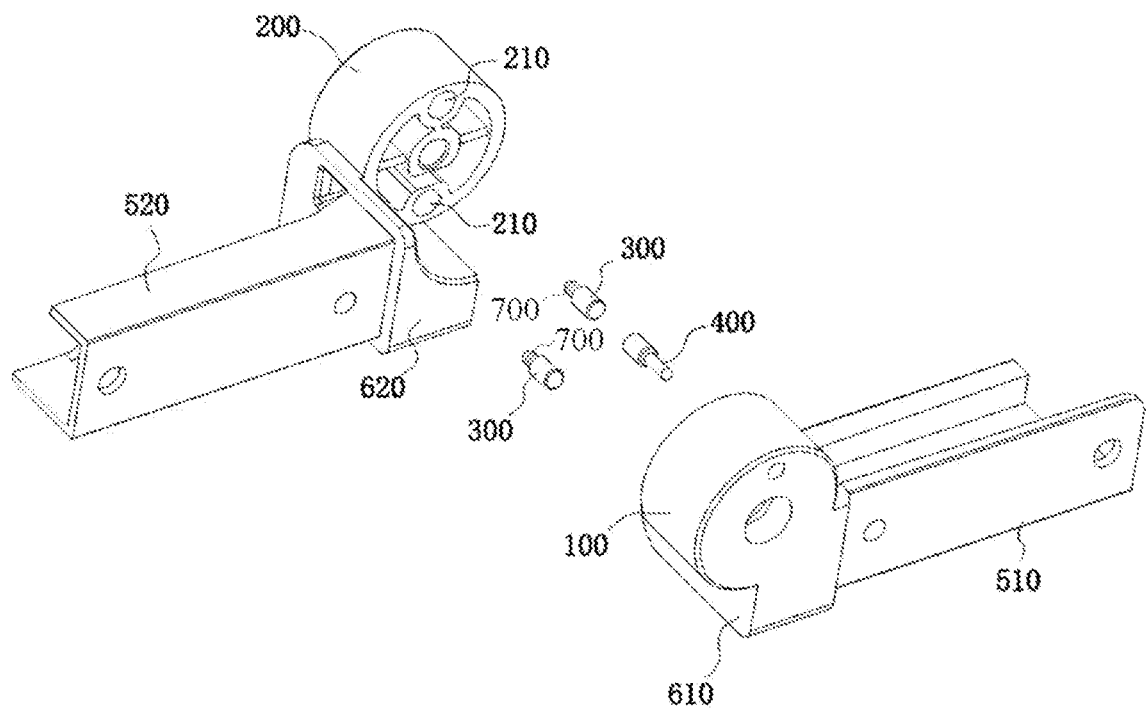
FIG. 7 is an exploded view illustrating the structure of a rotary shaft assembly according to another embodiment of the present application.

For example, as shown in FIG. 7, the rotary shaft assembly also includes an elastic member 700. The elastic member 700 is disposed on the second connecting base 200 and connected to the positioning pin 300. The elastic member 700 is configured to drive the positioning pin 300 to enter the positioning hole 110 when the elastic member 700 springs back from a compressed state. When the unlocking pin 400 exits the positioning hole 110, and the positioning pin 300 is coaxial with the positioning hole 110, the elastic member 700 springs back from the compressed state. The positioning pin 300 enters the positioning hole 110 under the elasticity of the elastic member 700 to implement the locking of the first connecting base 100 and the second connecting base 200. For example, in the technical solution of this embodiment, the elastic member 700 is a spring. In other embodiments, the elastic member 700 may be another element having an elastic characteristic, such as a polyurethane elastomer.

For example, as shown in FIGS. 1 to 3, the positioning pin 300 is a reducing pin. The spring sleeves the outside of the small-diameter end of the positioning pin 300 to implement the connection of the spring to the positioning pin 300. This structure can increase the reliability of the connection of the spring to the positioning pin 300. Of course, in other embodiments, the positioning pin 300 and the elastic member 700 may be connected in other manners. For example, the positioning pin 300 and the elastic member 700 are connected in a splicing manner. Other connection manners are not enumerated here.

For example, as shown in FIGS. 1 to 3, the second connecting base 200 is formed with an accommodation recess 210. The elastic member 700 and the first end of the positioning pin 300 are disposed in the accommodation recess 210. In this manner, the elastic member 700 and the first end of the positioning pin 300 can be protected and prevented from bumping or abrasion due to exposure to the outside. Moreover, this structure can also improve the consistency of the overall structure of the rotary shaft assembly.

For example, multiple accommodation recesses 210 are disposed. Along a circumferential direction in which the second connecting base 200 rotates relative to the first connecting base 100, the multiple accommodation recesses 210 are disposed at intervals on the second connecting base 200. One elastic member 700 and one positioning pin 300 are disposed in each accommodation recess 210 separately. After the first positioning pin 300 exits the positioning hole 110, the second connecting base 200 rotates relative to the first connecting base 100. When the unlocking pin 400 exits the positioning hole 110, and the second positioning pin 300 is coaxial with the positioning hole 110, the second positioning pin 300 enters the positioning hole 110, and the first connecting base 100 and the second connecting base 200 are locked. In this manner, the second connecting base 200 and the first connecting base 100 can be locked simply when the second connecting base 200 is rotated relative to the first connecting base 100 by an angle, thereby increasing the number of included angles between the second connecting base 200 and the first connecting base 100 when they are locked. Thus, the rotary shaft assembly can be locked according to use requirements, and the flexibility of the use of the rotary shaft assembly is improved. In another aspect, one elastic member 700 and one positioning pin 300 are disposed in each accommodation recess 210 separately. When the elasticity of an elastic member 700 fails, and the elastic member 700 cannot drive the positioning pin 300 to enter the positioning hole 110, there are other elastic members 700 that can drive the positioning pin 300 to enter the positioning hole 110. In this manner, the rotary shaft assembly still has a locking effect, and the locking reliability of the rotary shaft assembly is high.

In the technical solution of this embodiment, as shown in FIGS. 1 to 3, two accommodation recesses 210 are disposed. One accommodation recess 210 is disposed at the top of the second connecting base 200, and the other accommodation recess 210 is disposed at the bottom of the second connecting base 200. One elastic member 700 and one positioning pin 300 are disposed in each accommodation recess 210 separately. In this manner, the second connecting base 200 and the first connecting base 100 can be locked after the second connecting base 200 is rotated relative to the first connecting base 100 by 180°. Of course, in other embodiments, three, four or five accommodation recesses 210 may be disposed. The positions of multiple accommodation recesses 210 may be arranged in other forms. For example, along the circumferential direction in which the second connecting base 200 rotates relative to the first connecting base 100, one accommodation recess 210 may be disposed every 30°, 45° or 75°. The details are not enumerated here.

For example, as shown in FIGS. 1 to 4, the recess wall of the accommodation recess 210 is formed with a lubrication groove 211. The lubrication groove 211 is disposed along the axial direction of the accommodation recess 210 and is filled with grease. The grease can lubricate the elastic member 700 and the positioning pin 300 in the accommodation recess 210 to prevent at least one of the elastic member 700 or the positioning pin 300 from jamming in the accommodation recess 210 and has the effect of improving the operation flexibility of the locking and unlocking of the rotary shaft assembly.

For example, as shown in FIGS. 1 to 4, a stop 111 is disposed in the positioning hole 110. The positioning pin 300 in the positioning hole 110 can abut against the stop 111 to limit the length of the positioning pin 300 in the positioning hole 110 to ensure that in a locking state, the first end of the positioning pin 300 is outside the positioning hole 110, and the second end of the positioning pin 300 is inside the positioning hole 110. In this manner, the positioning pin 300 is prevented from completely entering the positioning hole 110, and thus a locking failure is avoided, and the locking reliability of the rotary shaft assembly is effectively improved.

For example, when the positioning pin 300 enters the positioning hole 110, the preceding elastic member 700 is still in the compressed state. At this time, the first end of the positioning pin 300 is outside the positioning hole 110 and connected to the elastic member 700, and the second end of the positioning pin 300 is inside the positioning hole 110 and abuts against the stop 111. Under the springback force of the elastic member 700, the second end of the positioning pin 300 continuously abuts against the stop 111, thereby greatly improving the locking effect of the rotary shaft assembly. It is to be understood that in other embodiments, when the positioning pin 300 enters the positioning hole 110, the preceding elastic member 700 may be in a natural state; and although the springback force of the elastic member 700 is absent, the positioning pin 300 in the positioning hole 110 still has a good locking effect.

For example, as shown in FIGS. 1 to 4, the first connecting base 100 is also formed with an unlocking hole 120. The unlocking hole 120 communicates with the positioning hole 110 and is coaxial with the positioning hole 110. The unlocking pin 400 is movably disposed in the unlocking hole 120. In this manner, the unlocking pin 400 is integrated with the first connecting base 100, and the trouble of storing the unlocking pin 400 separately is eliminated.

For example, as shown in FIGS. 1 to 4, the diameter of the positioning hole 110 is larger than the diameter of the unlocking hole 120, and the preceding stop 111 is the end surface of the hole wall of the unlocking hole 120. In this manner, the internal structure of the positioning hole 110 is simplified, and the area of contact between the stop 111 and the positioning pin 300 can be increased, thereby improving the effect of the stop 111. It is to be understood that in other embodiments, the stop 111 may be structured and disposed in other manners. For example, one or more stop plates are disposed on the inner wall of the positioning hole 110, or a stop pillar capable of entering the positioning hole 110 is disposed on the inner wall of the unlocking hole 120. Other manners are not enumerated here.

For example, as shown in FIGS. 1 to 4, the unlocking hole 120 is a stepped hole. The large-diameter end of the unlocking hole 120 communicates with the positioning hole 110. The unlocking pin 400 is a reducing pin. The step position of the unlocking hole 120 is in contact with the step position of the unlocking pin 400 to limit the movement range of the unlocking pin 400 and prevent the unlocking pin 400 from sliding out of the unlocking hole 120 after the unlocking pin 400 exits the positioning hole 110. In this manner, the consistency of the overall structure of the rotary shaft assembly is improved.

For example, as shown in FIGS. 1 to 5, the first connecting base 100 is also formed with a wire securing recess 130 configured to secure a wire. When the rotary shaft assembly is applied to an electrical device, such as a lamp, that needs to be connected to wires, the wires may be secured in the wire securing recess 130 so that not only the wires can be well protected, but also the consistency of the overall structure of the product can be effectively improved. In another aspect, it is possible to reduce the weight of the first connecting base 100 by disposing the wire securing recess 130 on the first connecting base 100, thereby reducing the overall weight of the rotary shaft assembly. Thus, the rotary shaft assembly can be suitable for a working condition in which components are required to be light in weight.

For example, as shown in FIGS. 1 to 5, the wire securing recess 130 is an annular recess. The wire securing recess 130 is disposed on the first connecting base 100 and faces the position of the second connecting base 200. When the second end of the positioning pin 300 exits the positioning hole 110, the end surface of the second end of the positioning pin 300 can abut against the end surface of the recess wall of the wire securing recess 130 and slide on the end surface of the recess wall of the wire securing recess 130. In this manner, when the second connecting base 200 is rotated relative to the first connecting base 100, the elastic member 700 is always in the compressed state.

For example, as shown in FIGS. 1 to 5, the rotary shaft assembly provided by this embodiment also includes a first connecting portion 510 and a second connecting portion 520. The first connecting portion 510 is connected to the first connecting base 100. The second connecting portion 520 is connected to the second connecting base 200. The first connecting portion 510 and the second connecting portion 520 are each configured to be connected to a component of another product (such as a table leg, a chair leg, a stand rod of a laptop stand, or a fluorescent tube 2) separately. When the first connecting base 100 and the second connecting base 200 are rotated relative to each other, the first connecting portion 510 and the second connecting portion 520 are driven to rotate relative to each other. In this manner, the folding effect of a corresponding product is implemented.

For example, as shown in FIGS. 1 to 5, the rotary shaft assembly provided by this embodiment also includes a first stop base 610 and a second stop base 620. The first connecting portion 510 is connected to the first connecting base 100 through the first stop base 610. The second connecting portion 520 is connected to the second connecting base 200 through the second stop base 620. The positioning hole 110 is disposed at the top or the bottom of the first connecting base 100. When the positioning pin 300 at the top or the bottom enters the positioning hole 110 to implement locking, the first stop base 610 abuts against the second stop base 620. In this manner, the first connecting base 100 and the second connecting base 200 can be rotated relative to each other in the range of 180°, and components of other products secured to the first connecting portion 510 and the second connecting portion 520 are prevented from bumping against each other due to an excessive rotation angle between the two.

The following is a brief description of the process of using the rotary shaft assembly provided in this embodiment, that is, the operation steps of locking and unlocking.

As shown in FIGS. 1 to 5, the positioning hole 110 and the unlocking hole 120 are disposed at the top of the first connecting base 100 and are coaxial. The unlocking pin 400 is disposed in the unlocking hole 120. The top and the bottom of the second connecting base 200 are each formed with an accommodation recess 210 (the top refers to the upper position of the second connecting base 200 of FIG. 1, and the bottom refers to the lower position of the second connecting base 200 of FIG. 1). One elastic member 700 and one positioning pin 300 are disposed in each accommodation recess 210 separately. The elastic member 700 and the positioning pin 300 in the accommodation recess 210 at the top are regarded as a first elastic member and a first positioning pin respectively. The elastic member 700 and the positioning pin 300 in the accommodation recess 210 at the bottom are regarded as a second elastic member and a second positioning pin respectively.

It is assumed that the rotary shaft assembly is in the initial state once the first positioning pin enters the positioning hole 110 from the first side of the positioning hole 110. At this time, the first connecting base 100 and the second connecting base 200 are locked with each other at an initial position. Then the unlocking pin 400 is pressed so that the unlocking pin 400 enters the positioning hole 110 from the second side of the positioning hole 110 and drives the first positioning pin to compress the first elastic member until the first positioning pin exits the positioning hole 110 so that the first connecting base 100 and the second connecting base 200 are unlocked. Then the second connecting base 200 is rotated relative to the first connecting base 100. At this time, under the elasticity of the first elastic member, the end surface of a second end of the first positioning pin abuts against the end surface of the recess wall of the wire securing recess 130 and slides on the end surface of the recess wall of the wire securing recess 130. Under the elasticity of the second elastic member, the end surface of a second end of the second positioning pin abuts against the end surface of the recess wall of the wire securing recess 130 and slides on the end surface of the recess wall of the wire securing recess 130. When the second connecting base 200 is rotated by 180° relative to the first connecting base 100, the second positioning pin is coaxial with the positioning hole 110. At this time, the second elastic member springs back and drives the second positioning pin to enter the positioning hole 110 from the first side of the positioning hole 110. When the second positioning pin enters the positioning hole 110, the unlocking pin 400 is pressed out of the positioning hole 110. In this manner, the first connecting base 100 and the second connecting base 200 are locked again. To rotate the second connecting base 200 in an opposite direction by 180°, the unlocking pin 400 is pressed again, and after the first connecting base 100 and the second connecting base 200 are unlocked, the second connecting base 200 is rotated in the opposite direction until the second connecting base 200 is rotated to the initial position. When the second connecting base 200 is at the initial position, the first positioning pin enters the positioning hole 110 under the action of the first elastic member so that the first connecting base 100 and the second connecting base 200 are locked at the initial position.

Figure 6:
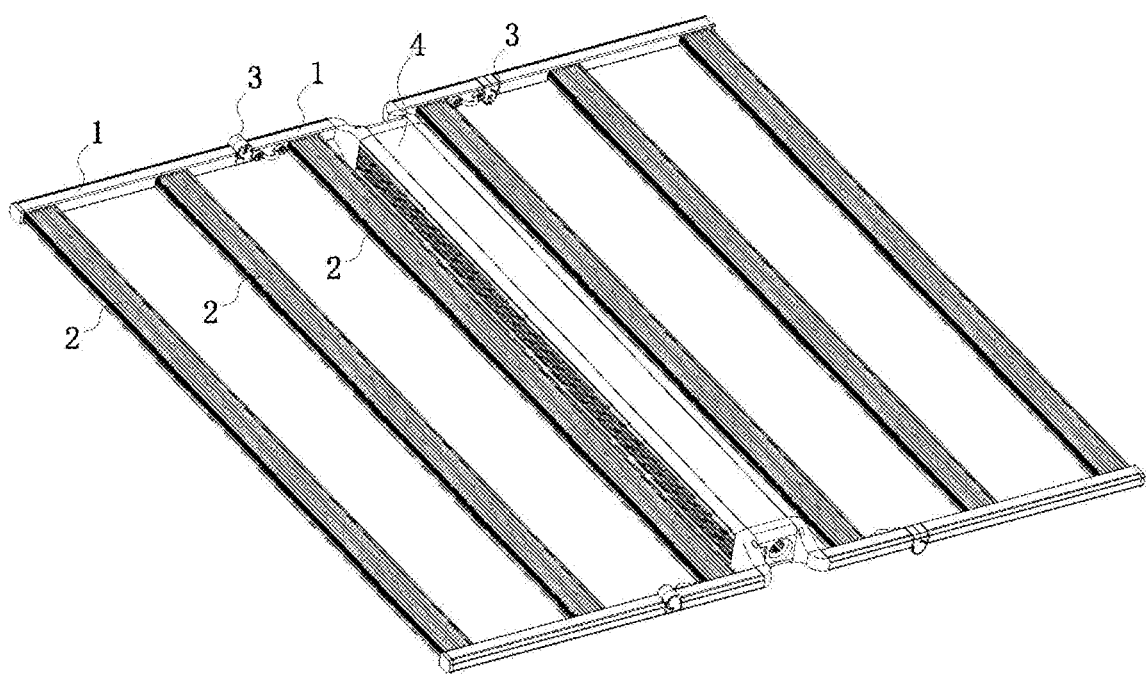
FIG. 6 is a perspective view of a lamp according to the embodiment.

Another embodiment provides a lamp. As shown in FIG. 6, the lamp includes at least two mounting brackets 1 and at least one preceding rotary shaft assembly 3. One mounting bracket is mounted on each first connecting base 100 separately. One mounting bracket is mounted on each second connecting base 200 separately. At least one fluorescent tube 2 is mounted on each mounting bracket 1. In this manner, the rotation and folding function of the mounting bracket 1 of the lamp is implemented. Moreover, not only two fluorescent tubes 2 can be rotated by an angle according to the use requirements, but also the overall volume of the lamp can be effectively reduced when the lamp is stored. When two mounting brackets 1 are rotated to a locking position, the locking reliability of the two is relatively high, and fluorescent tubes 2 can be prevented from bumping due to a locking failure.

For example, as shown in FIG. 6, in the technical solution of this embodiment, the lamp also includes a wire accommodation box 4. Mounting brackets 1 of the rotary shaft assembly 3 are securely connected to two sides of the wire accommodation box 4 so that the lamp can be folded on the two sides of the wire accommodation box 4. In this manner, the overall volume of the lamp is effectively reduced after the lamp is folded, thereby bringing about the effects of saving the package size of the lamp, reducing the package cost the lamp, being easily carried, being easily transported and being easily mounted.

The lamp provided by this embodiment can be folded on the two sides of the wire accommodation box 4. In this manner, the volume of the lamp is effectively reduced. Moreover, one accommodation recess 210, one positioning pin 300 and one elastic member 700 are disposed at the top of the second connecting base 200; and one accommodation recess 210, one positioning pin 300 and one elastic member 700 are disposed at the bottom of the second connecting base 200. With this arrangement, when the lamp is fully unfolded, the positioning pin 300 automatically enters the positioning hole 110 under the action of the elastic member 700 so that the lamp can be used upon being unfolded (that is, the shape is automatically fixed when the lamp is unfolded), thereby facilitating the use and mounting of the lamp.

What is claimed is:

1. A rotary shaft assembly, comprising:
a first connecting base formed with a positioning hole;
a second connecting base rotatably connected to the first connecting base;
a positioning pin having a first end movably connected to the second connecting base and having a second end configured to enter or exit the positioning hole from a first side of the positioning hole; and
an unlocking pin configured to enter or exit the positioning hole from a second side of the positioning hole, wherein the unlocking pin is configured to drive the positioning pin to exit the positioning hole when the unlocking pin enters the positioning hole, and the positioning pin is configured to enter the positioning hole when the unlocking pin exits the positioning hole and when the positioning pin is coaxial with the positioning hole,
wherein the first connecting base is further formed with an unlocking hole, wherein the unlocking hole communicates with the positioning hole and is coaxial with the positioning hole, and the unlocking pin is movably disposed in the unlocking hole; and
wherein the unlocking hole is a stepped hole, a large-diameter end of the unlocking hole communicates with the positioning hole, the unlocking pin is a reducing pin, and a step position of the unlocking hole is configured to be in contact with a step position of the unlocking pin to limit a movement range of the unlocking pin.

2. The rotary shaft assembly according to claim 1, further comprising:
an elastic member disposed on the second connecting base and connected to the positioning pin,
wherein the elastic member is configured to drive the positioning pin to enter the positioning hole when the elastic member springs back from a compressed state.

3. The rotary shaft assembly according to claim 2, wherein a stop is disposed in the positioning hole and configured to abut against the positioning pin in the positioning hole to limit a length of the positioning pin in the positioning hole.

4. The rotary shaft assembly according to claim 3, wherein the elastic member is in the compressed state when the positioning pin is in the positioning hole.

5. The rotary shaft assembly according to claim 2, wherein the second connecting base is formed with an accommodation recess, and the elastic member and the first end of the positioning pin are disposed in the accommodation recess.

6. The rotary shaft assembly according to claim 5, wherein a recess wall of the accommodation recess is formed with a lubrication groove, wherein the lubrication groove is disposed along an axial direction of the accommodation recess and is filled with grease.

7. The rotary shaft assembly according to claim 1, wherein the first connecting base is further formed with a wire securing recess configured to secure a wire.

8. A lamp, comprising:
at least two mounting brackets; and
at least one rotary shaft assembly,
wherein each of the at least one rotary shaft assembly comprises;
a first connecting base formed with a positioning hole;
a second connecting base rotatably connected to the first connecting base;
a positioning pin having a first end movably connected to the second connecting base and having a second end configured to enter or exit the positioning hole from a first side of the positioning hole; and
an unlocking pin configured to enter or exit the positioning hole from a second side of the positioning hole, wherein the unlocking pin is configured to drive the positioning pin to exit the positioning hole when the unlocking pin enters the positioning hole, and the positioning pin is configured to enter the positioning hole when the unlocking pin exits the positioning hole and the positioning pin is coaxial with the positioning hole,
wherein the first connecting base is further formed with an unlocking hole, wherein the unlocking hole communicates with the positioning hole and is coaxial with the positioning hole, and the unlocking pin is movably disposed in the unlocking hole, and
wherein the unlocking hole is a stepped hole, a large diameter end of the unlocking hole communicates with the positioning hole, the unlocking pin is a reducing pin, and a step position of the unlocking hole is configured to be in contact with a step position of the unlocking pin to limit a movement range of the unlocking pin; and
wherein one of the at least two mounting brackets is mounted on each first connecting base separately, and one of the at least two mounting brackets is mounted on each second connecting base separately; and
wherein at least one fluorescent tube is mounted on each of the at least two mounting brackets separately.

9. The lamp according to claim 8, further comprising:
an elastic member disposed on the second connecting base and connected to the positioning pin,
wherein the elastic member is configured to drive the positioning pin to enter the positioning hole when the elastic member springs back from a compressed state.

10. The lamp according to claim 9, wherein a stop is disposed in the positioning hole and configured to abut against the positioning pin in the positioning hole to limit a length of the positioning pin in the positioning hole.

11. The lamp rotary shaft assembly according to claim 10, wherein the elastic member is in the compressed state when the positioning pin is in the positioning hole.

12. The lamp according to claim 9, wherein the second connecting base is formed with an accommodation recess, and the elastic member and the first end of the positioning pin are disposed in the accommodation recess.

13. The lamp according to claim 12, wherein a recess wall of the accommodation recess is formed with a lubrication groove, and wherein the lubrication groove is disposed along an axial direction of the accommodation recess and is filled with grease.

14. The lamp rotary shaft assembly according to claim 8, wherein the first connecting base is further formed with a wire securing recess configured to secure a wire.

\* \* \* \* \*